United States Patent [19]

Boettcher

[11] 4,114,920
[45] Sep. 19, 1978

[54] BOAT FASTENING MEANS

[76] Inventor: Edward G. Boettcher, 254 Corbett St., Clearwater, Fla. 33516

[21] Appl. No.: 768,613

[22] Filed: Feb. 14, 1977

Related U.S. Application Data

[63] Continuation-in-part of Ser. No. 654,651, Feb. 2, 1976, abandoned.

[51] Int. Cl.$^2$ .............................................. B60P 3/10
[52] U.S. Cl. ................................. 280/414 R; 214/84
[58] Field of Search .................. 280/414 R; 214/506, 214/505, 85, 84; 9/1.2

[56] References Cited

U.S. PATENT DOCUMENTS

| 3,097,755 | 7/1963 | Fulcher | 280/414 R |
| 3,124,259 | 3/1964 | Goettl | 280/414 R |
| 3,138,271 | 6/1964 | De Lay et al. | 280/414 R |
| 3,750,805 | 8/1973 | Finney | 280/414 R |
| 3,938,829 | 2/1976 | Anderson | 280/414 R |
| 3,989,267 | 11/1976 | Robinson | 280/414 R |

Primary Examiner—John A. Pekar
Attorney, Agent, or Firm—Stein & Frijouf

[57] ABSTRACT

A fastening assembly is disclosed to attach a boat or like vehicle to a boat trailer or similar type of boat support. The assembly comprises a cradle which includes at least two arm elements attached to a suspension assembly which is interconnected between the boat support or trailer and the cradle. The cradle has a configuration which is substantially convergent or V-shaped to engage opposite sides of the bow of the boat and hold it in suspended relation through interconnection with the suspension assembly relative to the trailer or boat support. A biasing element is connected to the suspension assembly to bias the cradle away from the boat support when the boat is positioned thereon. An orienting assembly is disposed on or adjacent the cradle to engage the leading edge of the bow and orient the boat into locking engagement with a connecting element. The connecting element is disposed in predetermined relation to an eye bolt or other type of connecting element attached to the boat such that engagement of the boat onto the cradle and movable engagement of its leading edge with the orienting assembly automatically serves to position the eye bolt or predetermined portion of the boat in locking engageable relation with the connecting element.

12 Claims, 7 Drawing Figures

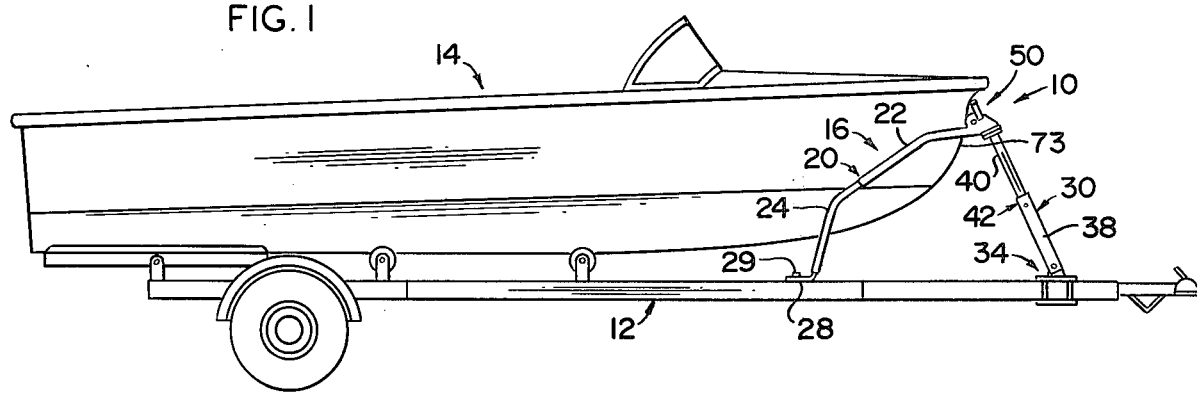
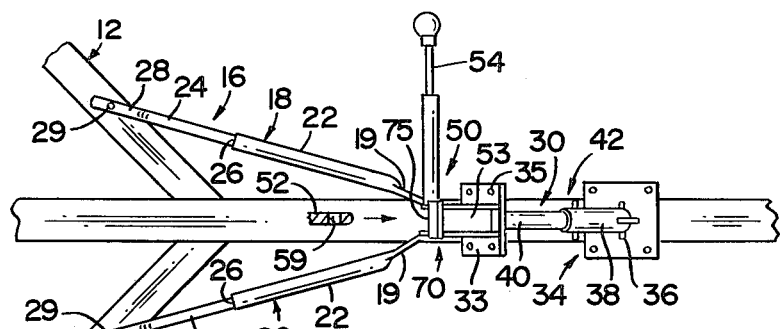
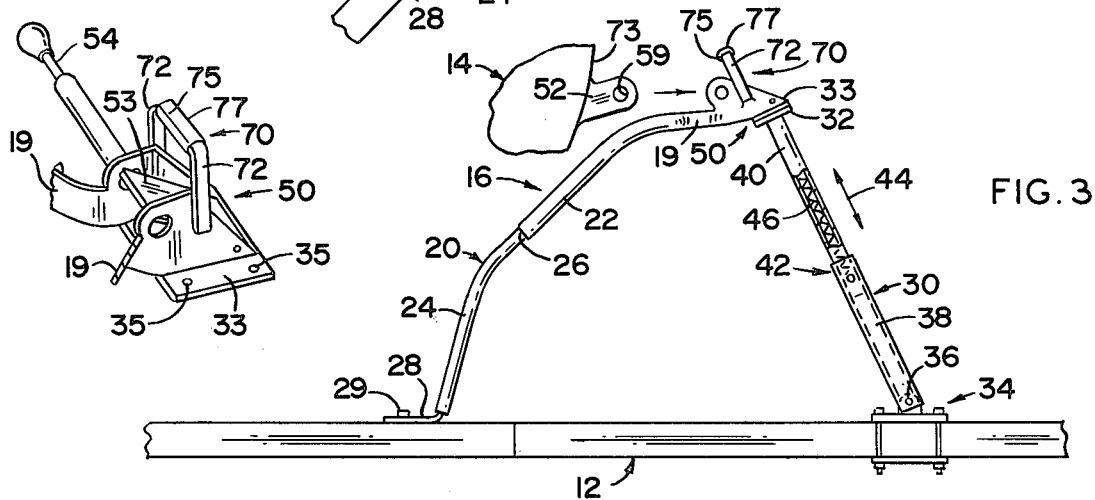
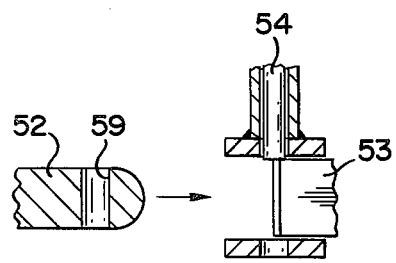
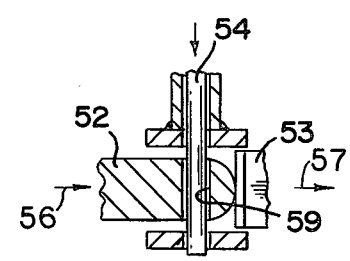
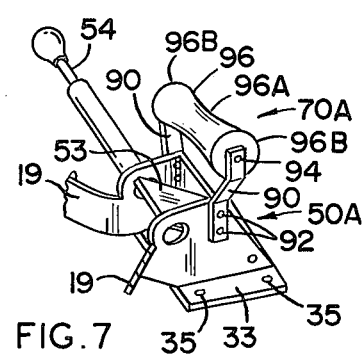

BOAT FASTENING MEANS

CROSS-REFERENCE TO RELATED APPLICATIONS

This is a continuation-in-part of application Ser. No. 654,651 filed Feb. 2, 1976, now abandoned.

BACKGROUND OF THE INVENTION

1. Field of the Invention

This invention relates to a fastening assembly primarily designed for use on a boat trailer or other mobile or fixed boat support including a supporting cradle used in combination with a suspension assembly to support and secure a predetermined portion of the boat in suspended, secured relationship relative to the boat support.

2. Description of the Prior Art

For many years there has been an increase in the popularity of relatively small boats or other marine craft. Related auxiliary equipment including boat trailers and like means are frequently used to support a pleasure craft and transport it from place to place. Generally, the marine craft that is considered herein is of the size capable of being removed from the water when not in use and transported to the user's home or storage facility rather than remaining in the water.

It accordingly has been the desire of the marine craft industry and related fields to develop an efficient, safe and durable trailer assembly specifically including a fastening assembly for mounting the pleasure craft adequately on a trailer or other boat support being utilized. Such a facility generally must encompass the features of support, suspension and secure connection in a manner which can readily be accomplished with a minimal amount of effort.

Such fastening assembly used in combination with boat trailers in the prior art are represented in the following U.S. Pat. Nos.: Yarbrough 2,503,535, De Lay 3,138,271, Buckner 3,185,330 and Theobald 3,390,796.

While the majority of the prior art fastening assemblies or devices utilized a suspension system incorporating biasing means or a spring element to at least partially suspend the boat in supported, mounted relation on the trailer, a number of these structures have become relatively impractical for a number of reasons. Generally, such prior art structures are unnecessarily complex and/or require strenuous effort in properly positioning and placing the boat on the trailer in a secured and supported position.

Certain prior art structures also, due to their unnecessary complexities are frequently of questionable durability and often times unnecessarily expensive both to produce and maintain.

Accordingly, it is seen that there is a need in the industries relating to pleasure craft for a safe, durable, relatively inexpensive and efficiently operable mechanism which facilitates the fastening, mounting and/or connecting of a boat onto a boat support whether that support be a mobile trailer or an immobile boat support element.

SUMMARY OF THE INVENTION

The present invention relates to a fastening assembly of the type primarily designed for securing, suspending and generally mounting a boat or like structure on a support.

Generally, the support with which the subject invention will be described is a trailer type structure designed to have the boat or like vehicle mounted thereon so as to enable the transporting of the boat to any preferred location. It should be noted, however, that while the fastening assembly of the present invention is specifically discussed with reference to its being mounted on a boat trailer, any type of support mechanism or boat support structure could be utilized in combination with the fastening assembly. Accordingly, the term "boat support" is meant as a generic term to include any other type of applicable structure on which the fastening assembly could be mounted.

The fastening assembly itself comprises a cradle means which includes at least two arm means each having one end attached to the boat support and the other end interconnected to a suspension means. The arm means are arranged in substantially convergent relationship relative to the leading edge of the bow of the boat being supported or fastened by the assembly. This convergent relationship may of course be defined as a substantially V-shaped configuration for the cradle means. In one embodiment, each of the arm means includes at least two arm portions which are movable relative to one another. It should be noted that each arm means can comprise a single arm portion and still accomplish the desired movement. This movement is advantageous due to the interconnection of the arm means to the suspension assembly and the movement of the suspension assembly when the boat is mounted in the cradle means due to the weight of the boat being exerted thereon.

The suspension means itself may comprise a single shaft element having at least in part a hollow configuration wherein a biasing means is mounted therein. The biasing means may be in the form of a spring element attached on the interior of the shaft element and more specifically in biasing relation to at least two shaft portions which comprise the shaft element. The shaft portions again move relative to one another along the logitudinal axis of the shaft element. This longitudinal movement of the various shaft portions relative to one another may be accomplished through a telescopic interconnection between the shaft portions.

A connection means in the form of a spring loaded snap bolt or similar type connection means is mounted generally adjacent to the point of interconnection between the cradle means and the suspension means. The snap bolt is adapted to meet in locking engagement with an eye bolt or connecting hook or other predetermined portion of the boat being fastened. This eye bolt or predetermined connecting portion of the boat, will automatically enter into locking engagement with the connecting means when the boat is properly oriented relative to the cradle means.

The present invention further comprises orienting means. One form of the orienting means comprises a single substantially U-shaped orienting element mounted substantially, immediately adjacent to the connecting means. Another form of the orienting means comprises roller means having a roller orienting element located adjacent the connection means. Disposition of the orienting means is such that upon initial engagement of the bow with the cradle means, the leading edge of the bow will movably engage and ride against the U-shaped orienting or roller element. As the leading edge of the bow, normally above the connecting bolt attached to the bow rides upwardly on the orienting element, the connecting eye bolt or hook, etc. will eventually move into engagement with the connecting means in activating disposition such that the snap bolt will be disposed into locking engagement with the connecting hook or eye bolt. Again, the relative disposition of the orienting element relative to the connecting means is such as to properly orient and allow riding of the leading edge of the bow thereon until the connecting eye bolt or like element is properly disposed to activate the connecting means.

In operation, the boat is brought onto the boat support into engagement with the cradle means, which supports opposite sides of the bow of the boat. When in properly oriented position thereon, the weight of the boat will cause pressure to be exerted on the cradle and more specifically on the suspension means. The suspension means and cradle connected thereto will transfer the weight to the biasing means allowing for proper suspension of the boat or more specifically the bow portion thereof relative to the boat support. Again, when properly oriented the connecting portion will be disposed in locking, engageable relation with a predetermined portion of the boat. The connection means may be of the type which may be automatically activated into a locked position when engaged by the eye bolt or other predetermined connecting portion of the boat being fastened.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of the fastening assembly of the present invention mounted on a conventional boat support.

FIG. 2 is a top view showing the various structural details of the fastening assembly.

FIG. 3 is a partial cutaway view and sectional view showing the interior of the suspension means of the fastening assembly and the relationship of a connecting portion of the boat relative to the connection means.

FIG. 4 is a detailed perspective view of the connecting means with orienting element attached in predetermined position thereto.

FIG. 5 is a detailed section view of a connecting portion of the boat immediately prior to being lockingly engaged by the fastening assembly.

FIG. 6 is a detailed sectional view of the embodiment of FIG. 5 wherein the locking portion of the boat is lockingly engaged with the connecting means of the fastening assembly.

FIG. 7 is a detailed perspective view of a variation of the connecting means shown in FIG. 4.

Similar reference characters refer to similar parts throughout the several view of the drawings.

DETAILED DESCRIPTION

As shown in FIGS. 1, 2 and 3, the fastening assembly of the present invention is generally indicated as 10 and is primarily designed for being mounted on a boat support 12 designed to have a boat or like structure 14 supported thereon. As stated above the present invention is directed to the fastening assembly 10 which can be used in combination with any of a variety of structural configurations which may broadly be termed a "boat support." It is not necessarily limited to use with a boat trailer as represented in the drawings to be described in detail hereinafter.

More particularly, the fastening assembly comprises cradle means generally indicated as 16 and including at least two arm means 18 and 20. In one embodiment of the present invention, each of the arm means includes arm portions 22 and 24 which may be telescopically connected to one another at 26. This telescopic connection allows movement of the arm portions 22 and 24 relative to one another along a common longitudinal axis. One end of each arm means 18 and 20 is attached to the boat support 12 by an attachment element 28 and a conventional connector 29. As stated above, however, each arm means 18 and 20 may be of a single piece construction.

The opposite end of each arm means 18 and 20 is connected to suspension means generally indicated as 30. One end of the suspension means 30 is attached to the boat support 12 by an attachment assembly generally indicated as 34. This attachment assembly 34 may be of standard design and permits relative movement between the suspension means 30 and the boat support 12 at connecting pin 36. The other end of suspension means 30 is integrally or otherwise connected to mounting plate 32 which is connected to a similarly configured and disposed base plate 33. The two plates 32 and 33 may be interconnected to one another by a conventional attachment element 35.

The suspension means 30 comprises at least two shaft portions 38 and 40 movably connected to one another and, in one embodiment, telescopically interconnected to one another as at 42 for movement along a common longitudinal axis. This movement is indicated by directional arrow 44 which will be explained in greater detail with relation to the operation of the fastening assembly 10. A biasing means 46 is mounted on the interior, hollow portion of the shaft portion 40. The disposition and arrangement of the biasing means 46 exerts a biasing force against the cradle means 16 to suspend the bow portion of the bow from contact with the boat support 12 as best shown in FIG. 1.

The fastening assembly further comprises a connnection means generally indicated as 50 which is mounted substantially adjacent to the area or point of interconnection between the cradle means 16 and the suspension means 30. The mounting is accomplished by attachment to plates 32 and 33 interconnected as set forth above. More specifically, the connection means 50 may be mounted on the free end of the shaft portion 40 comprising the suspension means 30 and specifically disposed in predetermined relation to a connecting portion 52 of the boat 14.

An orienting means generally indicated as 70 and best shown in FIGS. 3 and 4 comprises a substantially U-shaped orienting element 72 integrally formed to substantially straddle the connecting means 50. The orienting element 72 extends upwardly and substantially forwardly of the connecting means 50 and toward the boat 14 being mounted thereon. Disposition of the orienting element 72 is such as to movably engage the leading edge 73 of the bow of boat 14 such that the edge rides upon the outwardly extending edge portion 75 of the orienting element 72. This movable engagement between the leading edge 73 and the outwardly extending edge portion 75 continues until the connecting portion 52 trips tongue 53 thereby releasing a snap bolt 54 to extend through aperture 59 of the eye bolt 52. Accordingly, the leading edge 73 of boat 14 rides upon the outwardly extending edge 75 until the eye bolt 52 is properly oriented relative to the snap bolt 54 so as to cause locking engagement within the aperture 59 of the connecting eye bolt 52. As set forth hereinafter this locking engagement is clearly depicted in FIG. 6. In one embodiment of the present invention, each of the arm means 18 and 20 may be integrally connected as at 19 to the base or main frame of the connection means 50. Again, the extensions or connecting portions 19 of the arm means 18 and 20 are clearly shown in FIG. 4. An additional structural feature of the present invention may include a padding element 77 surrounding or mounted on the leading edge portion 75 of the orienting element 72. This padding element protects the leading edge 73 of boat 14 from scraping, etc. When the boat 14 is properly positioned on the cradle means 16, the connecting element 52 will be properly positioned relative to orienting means 70 to trip tongue 53 and automatically lock snap bolt 54 through aperture 59. As best shown in FIGS. 5 and 6, the tongue member 53 is positioned in blocking relation to the spring biased snap bolt 54 until the connecting portion 52 of the boat 14 pushes tongue member 53 out of this blocking engagement as indicated by directional arrows 56 and 57. The snap bolt 54 thereby passes through aperture 59 and serves to securely engage the bolt 14 in suspended, supported relation to the fastening assembly 10.

FIG. 7 is a detailed perspective view of connection means 50A which is a variation of the connection means 50 shown in FIG. 4. Similar structural elements have been labeled with similar reference numerals. In this embodiment, the orienting means 70A comprises plural support arms 90 secured by conventional fasteners 92 shown as bolts threaded into the connection means 50A. A shaft 94 extends through apertures in the plural support arms 90 for journalling a roller orienting element 96. The shaft 94 may take the form of an elongated bolt extending through the apertures in the plural support arms 90 and secured by a locking nut.

The roller orienting element 96 is shown as a tapering roller element having a central diameter 96A which is substantially less than the outer roller diameters 96B. This double taper of the roller orienting element 96 enables the roller to guide the leading edge 73 of boat 14 centered relative to the connection means 50A. The roller orienting element 96 also facilitates longitudinal and upward movement of the boat 14 relative to the connection means 50. The plural support arms 90, shaft 94 and roller orienting element 96 comprises roller means for orienting the leading edge of the boat 14 relative to the connection means 50A. The roller orienting element 96 may be constructed of a hard rubber material to also act as a padded element as padded element 77 in FIG. 4. It should be understood that the remainder of the connection means 50A operates similar to the connection means 50 shown in FIG. 4.

In operation, the boat or like structure 14 is mounted on the boat support 12, generally from the rear thereof as shown in FIG. 1. When the bow of the boat engages the arm means 18 and 20 of the cradle 16 the weight of boat 14 is exerted against the biasing means 46 which is mounted within the shaft of the suspension means 30. The leading edge 73 engages and rides on padded elements 77 or 96 until connecting bolt or hook 52 activates connecting means 50 or 50A. When properly oriented the connecting bolt 52 serves to engage and activate the connecting means 50 or 50A as described with references to FIGS. 4 and 5.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been described:

What is claimed is:

1. A boat fastening assembly of the type primarily designed for use with a boat support, said fastening assembly comprising: cradle means mounted on the boat support, suspension means interconnected between the boat support and the cradle means in at least partially supporting relation thereon, connecting means disposed adjacent the interconnection of said cradle means and said suspension means and in position to lockingly engage a predetermined portion of a boat, biasing means connected to said suspension means and disposed to normally bias said suspension means in supportive movable relation to said cradle means and the boat mounted thereon, orienting means mounted in predetermined relation to said connection means, whereby movable engagement with the boat and said orienting means serves to properly position the boat relative to said connection means; said cradle means comprising at least two arm means; each of said arm means having one end connected to the boat support and having the other end connected to said suspension means; and said two arm means disposed in convergent relationship to one another enabling said cradle means to extend on opposite side of the bow of the boat to supportingly engage the boat being fastened.

2. A boat fastening assembly as in claim 1, wherein at least one of said arm means comprises at least two arm portions, said two arm portions telescopically interconnected to one another, said two arm portions of each arm means movable relative to one another along a common longitudinal axis.

3. A boat fastening assembly as in claim 1, wherein said suspension means comprises a shaft element movably interconnected between tthe boat support and said cradle means, said shaft element including a substantially hollow configuration, said biasing means mounted within the substantially hollow interior of said shaft element.

4. A boat fastening assembly as in claim 3, wherein said biasing means comprises a spring element mounted within said hollow shaft element, said shaft element comprising at least two shaft portions movably relative to one another.

5. A boat fastening assembly as in claim 4, wherein said spring element is disposed to normally bias said shaft portions away from one another, said shaft element disposed to regulate movement of said cradle means relative to said boat support.

6. A boat fastening assembly as in claim 4, wherein said two shaft portions are telescopically connected to one another and interconnected to said cradle means and said biasing means to regulate position of the boat relative to the boat support.

7. A boat fastening assembly as in claim 3, wherein said connecting means is mounted on said shaft element and disposed in engageable relation to a predetermined portion of the boat being fastened.

8. A boat fastening assembly of the type primarily designed for use with a boat support, said fastening assembly comprising: cradle means mounted on the boat support, suspension means interconnected between the boat support and the cradle means in a least partially supporting relation thereon, connecting means disposed adjacent the interconnection of said cradle means and said suspension means and in position to lockingly engage a predetermined portion of a boat, biasing means connected to said suspension means and disposed to normally bias said suspension means in supportive movable relation to said cradle means and the boat mounted thereon, orienting means mounted in predetermined relation to said connection means, whereby movable engagement with the boat and said orienting means serves to properly position the boat relative to said connection means; said orienting means comprising an orienting element mounted to extend upwardly and outwardly from said connection means for sliding engagemet with the leading edge of the boat to dispose the boat into locking engagement with said connection means.

9. A boat fastening assembly of the type primarily designed for use with a boat support, said fastening assembly comprising: cradle means mounted on the boat support, suspension means interconnected between the boat support and the cradle means in at least partially supporting relation thereon, connecting means disposed adjacent the interconnection of said cradle means and said suspension means and in position to lockingly engage a predetermined portion of a boat, biasing means connected to said suspension means and disposed to normally bias said suspension means in supportive movable relation to said cradle means and the boat mounted thereon, orienting means mounted in predetermined relation to said connection means, whereby movable engagement with the boat and said orienting means serves to properly position the boat relative to said connection means; said orienting means being connected to said connection means a padded element mounted on a leading portion of said orienting means facing the leading edge of the boat being supported, whereby sliding engagement between the leading edge of the boat and said orienting means serves to dispose the boat into locking engagement with said connection means.

10. A boat fastening assembly of the type primarily designed for use with a boat support, said fastening assembly comprising: cradle means mounted on the boat support, suspension means interconnected between the boat support and the cradle means in at least partially supporting relation thereon, connnecting means disposed adjacent the interconnection of said cradle means and said suspension means and in position to lockingly engage a predetermined portion of a boat, biasing means connected to said suspension means and disposed to normally bias said suspension means in supportive movable relation to said cradle means and the boat mounted thereon, orienting means mounted in predetermined relation to said connection means, whereby movable engagement with the boat and said orienting means serves to properly position the boat relative to said connection means; said orienting means including roller means adapted for cooperation with the leading edge of the boat to dispose the boat into locking engagement with said connection means, said roller means including integral guide means for guiding the leading edge of the boat, said roller means including plural arms extending outwardly and substantially upwardly from said connection means, shaft means extending between said plural support arms, and a roller element rotatably mounted on said shaft means for facilitating movement of the boat relative to said connection means.

11. A boat fastening assembly as in claim 10, wherein said roller element has a central diameter substantially less than the end diameters of said roller element for guiding the leading edge of the boat.

12. A boat fastening assembly of the type primarily designed for use with a boat support, said fastening assembly comprising: cradle means mounted on the boat support, suspension means interconnected between the boat support and the cradle means in at least partially supporting relation thereon, connecting means disposed adjacent the interconnection of said cradle means and said suspension means and in position to lockingly engage a predetermined portion of a boat, biasing means connected to said suspension means and disposed to normally bias said suspension means in supportive movable relation to said cradle means and the boat mounted thereon, orienting means mounted in predetermined relation to said connection means, whereby movable engagement with the boat and said orienting means serves to properly position the boat relative to said connection means, said suspension means comprising at least two shaft portions movably interconnected to one another; and said biasing means being disposed to normally bias said shaft portions away from one another to regulate the movement of said cradle means relative to the boat support.

* * * * *

UNITED STATES PATENT AND TRADEMARK OFFICE
CERTIFICATE OF CORRECTION

PATENT NO. : 4,114,920
DATED : September 19, 1978
INVENTOR(S) : Edward G. Boettcher It is certified that error appears in the above-identified patent and that said Letters Patent are hereby corrected as shown below:

Column 6, line 49, after between delete extra "t" from "the";

Column 7, line 9, "a" should be --at--;

line 24, Delete "engagemet" and insert --engagement--.

Signed and Sealed this

Nineteenth Day of December 1978

[SEAL]

Attest:

RUTH C. MASON
Attesting Officer

DONALD W. BANNER
Commissioner of Patents and Trademarks